United States Patent [19]

Matsuzaki et al.

[11] Patent Number: 5,417,313
[45] Date of Patent: May 23, 1995

[54] DISC ROTOR FOR PREVENTING SQUEAL

[75] Inventors: Mikio Matsuzaki, Kasukabe; Toshitaka Izumihara, Kitamoto; Toru Yoshino, Gyoda, all of Japan

[73] Assignees: Akebno Brake Industry Co., Ltd., Tokyo; Akebono Research And Development Centre Ltd., Hanyu, both of Japan

[21] Appl. No.: 240,399

[22] Filed: May 10, 1994

Related U.S. Application Data

[63] Continuation of Ser. No. 915,977, Jul. 21, 1992, abandoned.

[30] Foreign Application Priority Data

Jul. 23, 1991 [JP] Japan .................. 3-205580

[51] Int. Cl.⁶ .................................... F16D 65/12
[52] U.S. Cl. .................... 188/218 XL; 188/264 AA; 192/113.2
[58] Field of Search ........ 188/218 A, 218 XL, 264 A, 188/264 AA; 192/113.2

[56] References Cited

U.S. PATENT DOCUMENTS

| 3,809,192 | 5/1974 | Stehle ................ 188/218 XL |
| 4,469,203 | 9/1984 | Herbulot et al. ........ 188/218 XL |

FOREIGN PATENT DOCUMENTS

| 2083987 | 12/1971 | France . | |
| 2458048 | 6/1976 | Germany ............... 188/264 A |
| 51-68985 | 5/1976 | Japan . | |
| 54-108880 | 7/1979 | Japan . | |
| 56-164236 | 12/1981 | Japan . | |
| 1114296 | 5/1968 | United Kingdom . | |
| 2024966 | 1/1980 | United Kingdom ........ 188/218 XL |
| 2125911 | 3/1984 | United Kingdom ........ 188/218 A |
| 2239685 | 7/1991 | United Kingdom . | |

*Primary Examiner*—Robert J. Oberleitner
*Assistant Examiner*—Kevin D. Rutherford
*Attorney, Agent, or Firm*—Cushman Darby & Cushman

[57] ABSTRACT

A hollow hole is radially formed in a rotor in at least one position on its circumference so that the minimum thickness between an inner surface of the hollow hole and each of the front and rear braking surfaces is selected to be not larger than 3 mm. Alternatively, in a ventilated rotor, at least one of a plurality of holes formed radially in the rotor is shaped into an expanded hole so that the minimum thickness between an inner surface of the hole and each of the front and rear braking surfaces is selected to be not larger than 3 mm. Two rows of small circular holes may be formed in a specific arrangement so as to penetrate a disc rotor. If longitudinal wave vibration is transmitted to the disc rotor, squeals due to an even number order resonance mode, that is, a resonance mode of the second, fourth, sixth order or the like, can be effectively attenuated by specially shaped hollow holes, reduced holes, or two rows of small circular holes formed in a disc rotor.

11 Claims, 6 Drawing Sheets

DISC ROTOR FOR PREVENTING SQUEAL

This is a continuation of U.S. application No. 07/915,977, filed on Jul. 21, 1992, which was abandoned.

BACKGROUND OF THE INVENTION

The present invention relates to a squeal preventing disc rotor for effectively preventing a squeal from occurring when a disc brake is operated.

In a disc brake in which a disc rotor rotating with an axle is pressingly sandwiched between friction pads operated by oil pressure or the like to perform braking, it is known that an extremely uncomfortable high frequency sound called a brake squeal is generated depending on the hardness of the disc rotor, the affinity between the rotor and the friction pads, or the like, when the disc rotor is pressingly sandwiched by the friction pads.

As a countermeasure to the generation of such a high frequency sound, a metal annular member is fitted in a disc rotor at its outer circumference as disclosed in Japanese Patent Unexamined Publication No. Sho-56-164236, or a hole or a groove is formed in a rotor at its braking surface so as to shift a resonant point as disclosed in Japanese Utility Model Unexamined Publication No. Sho. 54-108880.

Recently, however, various kinds of materials have been used as friction materials. For example, when a material in a group of semi-metallic or non-asbestos is used as friction pads, it is impossible to sufficiently suppress the squeal by means of the countermeasure for suppressing vibrations as described above. In order to investigate the cause, a brake test was actually performed by use of friction of a group of semi-metallic or non-asbestos materials. As a result, it was found that a squeal is caused mainly due to a so-called longitudinal wave (a compressional wave) in which the front and rear surfaces of a rotor vibrate in the directions opposite to each other. FIG. 7 shows the direction of wave transmission in the rotor disc at arrow 70. Arrows 72 and 74 show the directions of vibration, and nodal lines of vibration 76 are formed.

The fact was proved by the detection that the resonance point of a longitudinal wave obtained in an excitation test for measuring a vibration characteristic of a single rotor product as shown in FIG. 8 coincides with the frequency of a squeal in an actual car test using pads of a group of non-asbestos as shown in FIG. 9. This result applied to an actual car test using pads of a group of semi-metallic material.

FIG. 8 shows a vibration (longitudinal wave) application test result. Arrow 80 in FIG. 8 shows the direction of the longitudinal wave transmission. In the graph of FIG. 8, the overplotted dark areas at points 82, 84 and 86 are the Second mode resonance, the Fourth mode resonance, and the Sixth mode resonance, respectively, for the resonance point corresponding to squeal and resonance point of longitudinal wave. FIG. 9 shows an actual car squeal test result, showing background noise 90, noise (squeal) corresponding to Second resonance mode of longitudinal wave 92, Fourth mode of resonance 94, and the Sixth mode of resonance 96.

As a result of a further experiment in which friction pads of a group of non-asbestos were pressingly fitted on each of disc rotors which were different in diameter from each other and which were used in four actual cars (cars A, B, C and D) respectively to thereby investigate the frequency characteristics, the data shown in FIG. 10 was obtained. Being apparent from FIG. 10, portions at which noises are caused by longitudinal waves concentrate on resonance modes formed in even number orders, that is, the second, fourth, and sixth orders. This is because the frequencies in the other even number order modes exceed the human audible range of frequency to thereby cause no problem. The reason why noise is not generated in any odd mode is that the odd number mode has no resonance point because a disc or ring-like body such as a rotor has no open end unlike a rod-like body having open ends so that compressional waves circulating in the rotor solid body interfere with each other to cancel the odd modes. FIG. 10 shows the calculated frequency of the longitudinal waves of the sixth mode 106, the Fourth mode 104 and the Second mode 102 as a function of the rotor outer diameter. FIG. 10 also shows a depiction of the Second mode longitudinal waves 112 and the Fourth mode longitudinal waves 114, as they travel around the disc rotor.

SUMMARY OF THE INVENTION

On the basis of the above, it is an object of the present invention to effectively attenuate a brake squeal caused mainly by a longitudinal wave as well as by a transverse wave, only by the provision of a hollow hole or a hole of a special shape or two rows of small circular holes of a special arrangement in at least one circumferential portion of the braking surfaces of a disc rotor.

In order to achieve the above object, in the solid rotor according to the present invention, a hollow hole is formed in the rotor in at least one position on its circumference so as to extend from the radially outside toward the inside so that the minimum thickness between the hollow hole and each of front and rear braking surfaces is selected to be not larger than 3 mm. In the ventilated rotor, at least one of plural holes formed radially in the rotor is shaped into an expanded hole so that the minimum thickness between the hole and each of front and rear braking surfaces is selected to be not larger than 3 mm.

In another configuration of the present invention, in a disc rotor, a first row of small circular holes respectively having centers on any axis OX extending in a desired radial direction from a center of the rotor, and having the same shape are formed so as to penetrate front and rear braking surfaces, and a second row of small circular holes respectively having centers on a second axis parallel to the first axis are similarly formed so as to penetrate the front and rear braking surfaces, the first and second rows of small circular holes being formed so as to satisfy the conditions of $$d' > C'', \ d'' > C', \text{ and } r' - r \geq 0$$

where $d'$ and $r'$ represent a diameter and a radius of each of the small circular holes in the first row, $C'$ represents an intervals between the small holes in the first row, $d''$ represents a diameter of each of the small circular holes in the second row, $C''$ represents an interval between the small holes in the second row, and represents the shortest distance between the first axis and the small circular holes in the second row.

When the friction pads pressingly sandwich the braking surfaces of the disc rotor so as to perform a braking operation, it is possible to effectively attenuate a brake squeal caused mainly by a longitudinal wave as well as by a transverse wave by a hollow hole or a cooling hole of a special shape or two rows of small circular holes of a special arrangement formed in at least one circumferential portion of the braking surfaces of the disc rotor.

BRIEF DESCRIPTION OF THE DRAWINGS

In the accompanying drawings:

FIGS. 1A and 1B are views showing an embodiment of the present invention in the case where the disc rotor is a solid rotor, in which FIG. 1A is a plan view of the rotor, and FIG. 1B is a partially broken side view of the rotor.

FIGS. 2A and 2B are views showing a second embodiment of the present invention in the case where the disc rotor is a ventilated rotor, in which FIG. 2A is a partially broken side view of the rotor, and FIG. 2B is an enlarged view of a reduction hole.

FIGS. 4A, 4B and 4C are view showing a third embodiment of the present invention in which small circular hole groups in two rows are formed in a disc rotor, in which FIG. 4A is a plan view of a rotor, FIG. 4B is a partially broken side view of the rotor, and FIG. 4C is an enlarged view of small circular hole groups in two rows.

DETAILED DESCRIPTION OF THE PREFERRED EMBODIMENTS

Figure 1A:
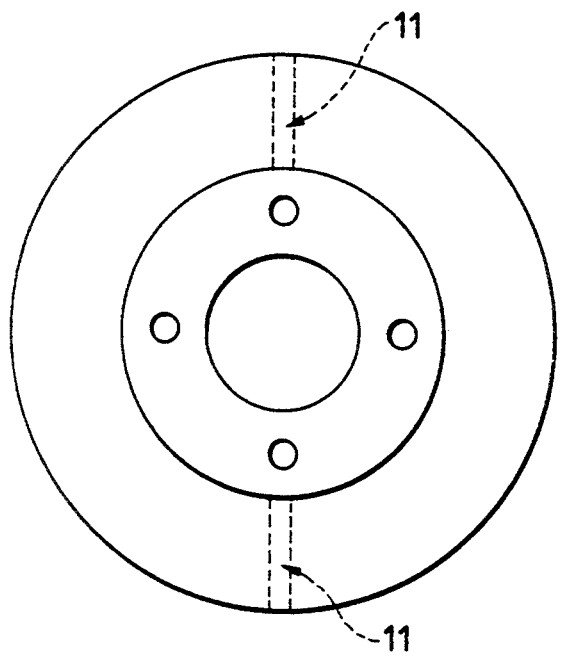
Figure 1B:
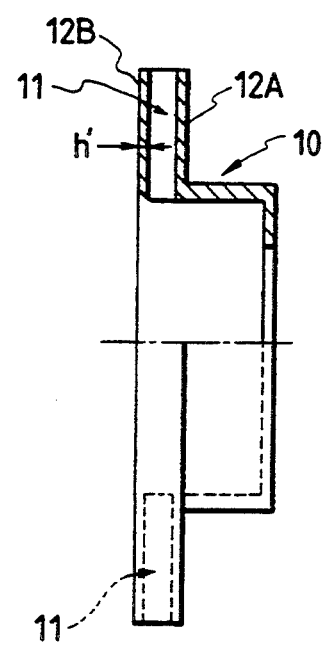

FIGS. 1A and 1B show a first embodiment of the present invention in the case where a disc rotor is a solid rotor. A hollow hole 11 is formed in a solid rotor 10 in at least one circumferential portion of the disc and formed radially from the outside toward the inside. The sectional shape of the hollow hole 11 may be not only circular but square, rectangular, or oval.

Figure 2A:
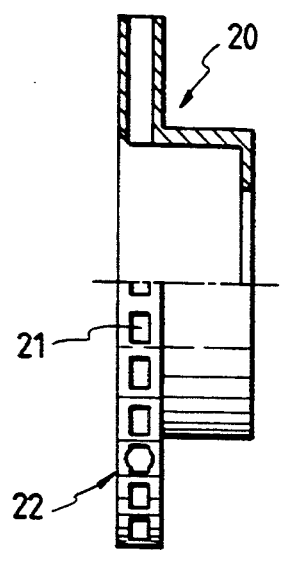
Figure 2B:
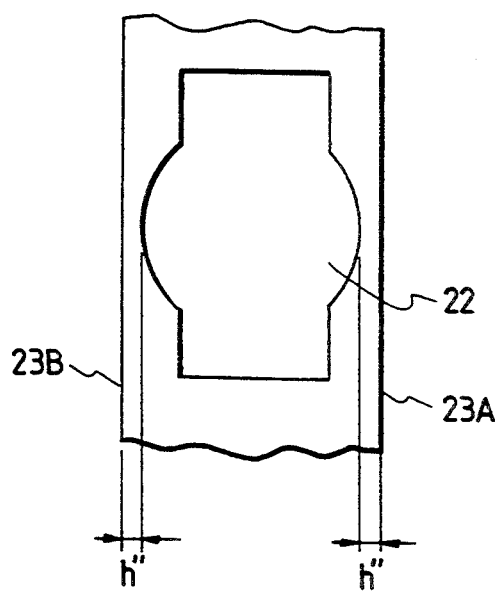

FIGS. 2A and 2B show a second embodiment of the present invention where a disc rotor is a ventilated rotor, in which FIG. 2A is a sectional view of a rotor and FIG. 2B is an enlarged view of a reduction hole 22. At least one of a plurality of cooling holes 21 provided radially in the ventilated rotor 20 for passing cooling air therethrough is subjected to reduction work so as to form a reduction hole 22 partially enlarged in its inner hole portion (hereinafter referred to as a reduction hole.)

The minimum thickness of each of the braking surfaces 12A and 12B of the rotor which remain after the hollow holes 11 are formed are represented by h' in the first embodiment, and, on the other hand, the minimum thickness h" of each of the braking surfaces 23A and 23B of the rotor which remain after the reduction hole 22 is formed is represented by h" in the second embodiment. A test was performed to measure the generation of resonant frequencies and the degree of braking squeal while changing the thicknesses h' and h".

Here, the generation of resonant frequencies and the degree of braking squeal were numerically defined as a squeal coefficient $N_P$, which is an accumulation of a sound pressure ($\mu$br) converted from a sound pressure level (dB) representing the degree of noise due to a squeal generated in one test.

Accordingly, the squeal coefficient $N_P$ is expressed by $$N_P = 100/N \sum_{i=1}^{n} P_i$$

Where, N, $P_i$, and n represent the number of times of braking, a sound pressure ($\mu$br) of a squeal, and the number of times of generation of the noises, respectively.

Figure 3:
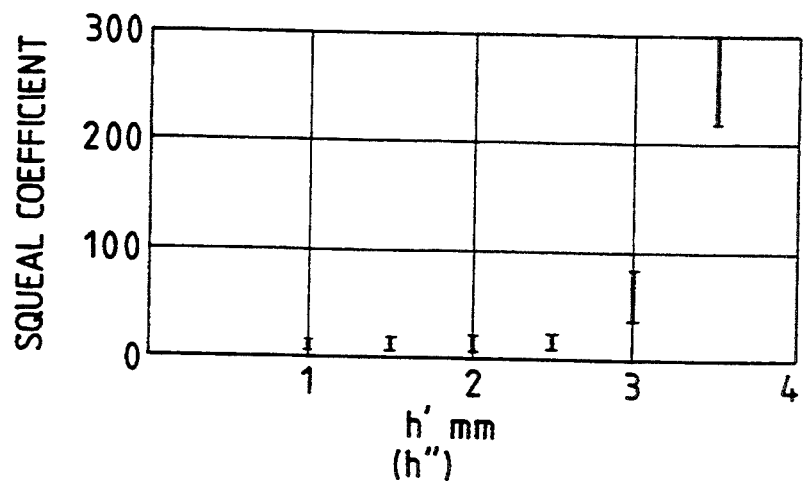
FIG. 3 is a brake test result table showing the relationship between the squeal coefficient and the thickness h'(h") of the portion of a braking surface in which holes are formed.

FIG. 3 is a table showing the results of a brake test showing the degree of the squeal coefficient when the thickness h' or h" was changed. The results of the test show that the squeal coefficient becomes large in a range in which the thickness h' (h") exceeds 3 mm, and that there is no substantial effect for preventing a squeal when the thickness h' (h") increases beyond 3 mm.

Figure 4C:
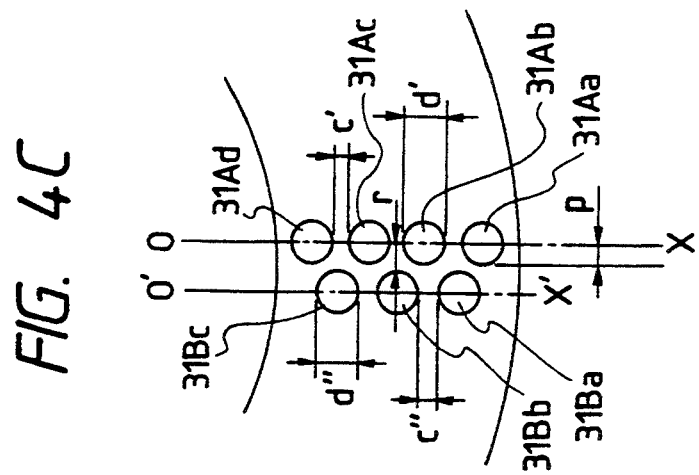
Figure 4B:
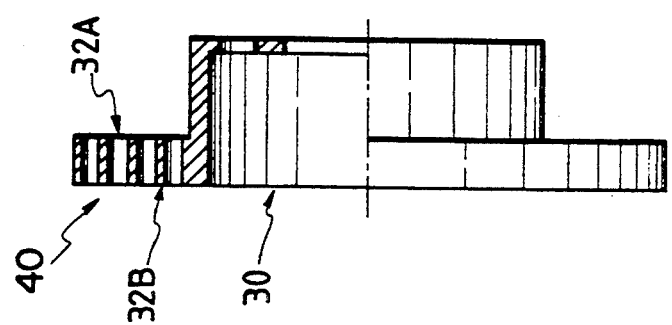
Figure 4A:
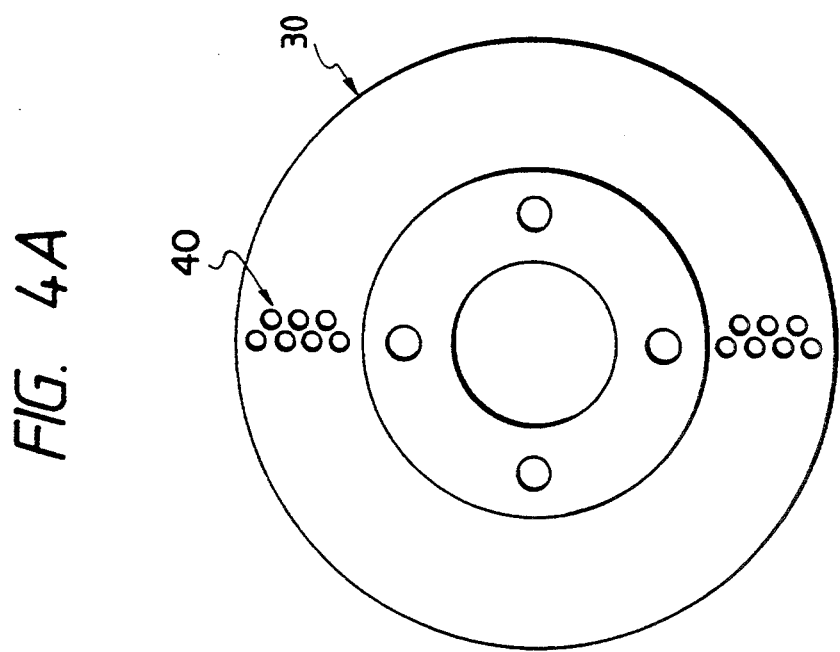

FIG. 4A shows a third embodiment in which two rows of small circular holes are formed in one circumferential portion of a disc rotor so as to extend in the radial direction, FIG. 4B is a partially broken side view of the disc rotor, and FIG. 4C is an enlarged view showing the two rows of small circular holes.

A first row of small circular holes (31Aa, 31Ab, 31Ac, 31Ad) and a second row of small circular holes (31Ba, 31Bb, 31Bc) are formed in the disc rotor 30 so as to be arranged in parallel to each other. Each of the small circular holes penetrates to the front and rear braking surfaces 32A and 32B.

The small circular holes (31Aa, 31Ab, 31Ac, and 31Ad) in the first row respectively have circular sections having radii equal to each other and having centers on a first axis OX extending in a desired radial direction from the center of the rotor. The small circular holes (31Ba, 31Bb, and 31Bc) in the second row respectively have circular sections having radii equal to each other and having centers on a second axis O'X' parallel to the first axis OX.

Figure 5:
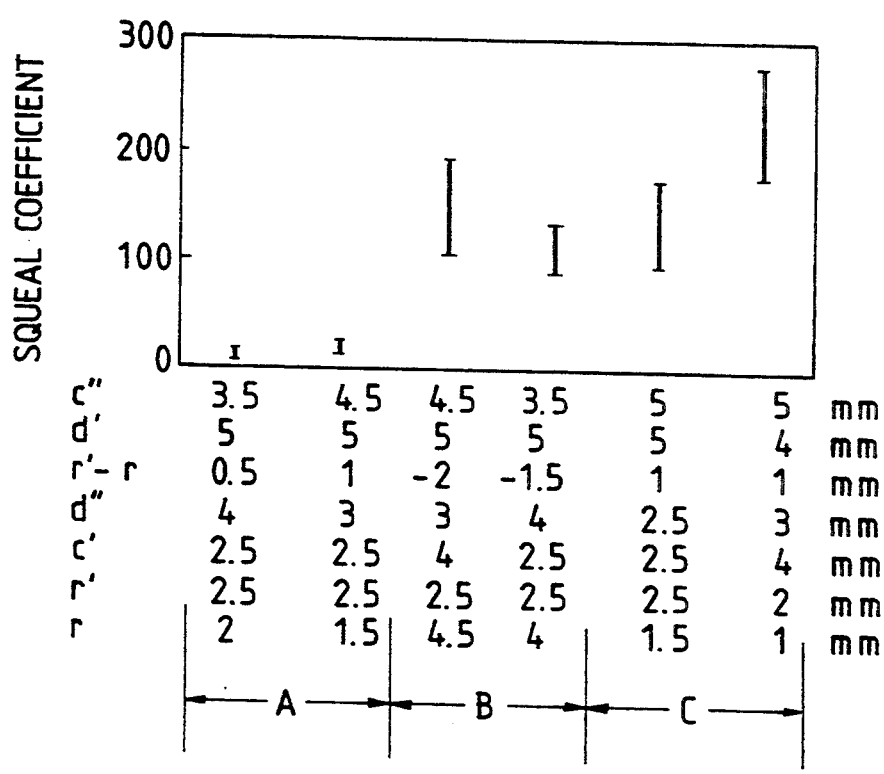
FIG. 5 is a brake test result table showing the relationship between the squeal coefficient and the arrangement of the two rows of small circular holes.

Assuming that the diameter and radius of each of the small circular holes in the first row are represented by d' and r'; the interval between the small circular holes in the first row is represented by C'; the diameter of each of the small circular holes in the second row is represented by d"; the interval between the small circular holes in the second row is represented by C"; and the shortest distance between the first axis OX and the small circular holes in the second row is represented by r, it was then found from a result of the brake test that a squeal was prevented effectively when the conditions of $d' > C''$, $d'' > C'$, and $r' - r \geq 0$ were satisfied. FIG. 5 shows the results of the brake test at that time, and shows the relationship among C", C', d", d', r'−r, and the squeal coefficient. When r'−r was −2 or −1.5, the squeal coefficient was large (in the range B) even if d' was larger than C". When d' was equal to or smaller than C″, the squeal coefficient was also large (in the range C) even if r′−r was 1. However, the squeal was effectively reduced in the range A where d′>C″, d″>C′, and r′−r≧0 (in the range a).

Figure 6:
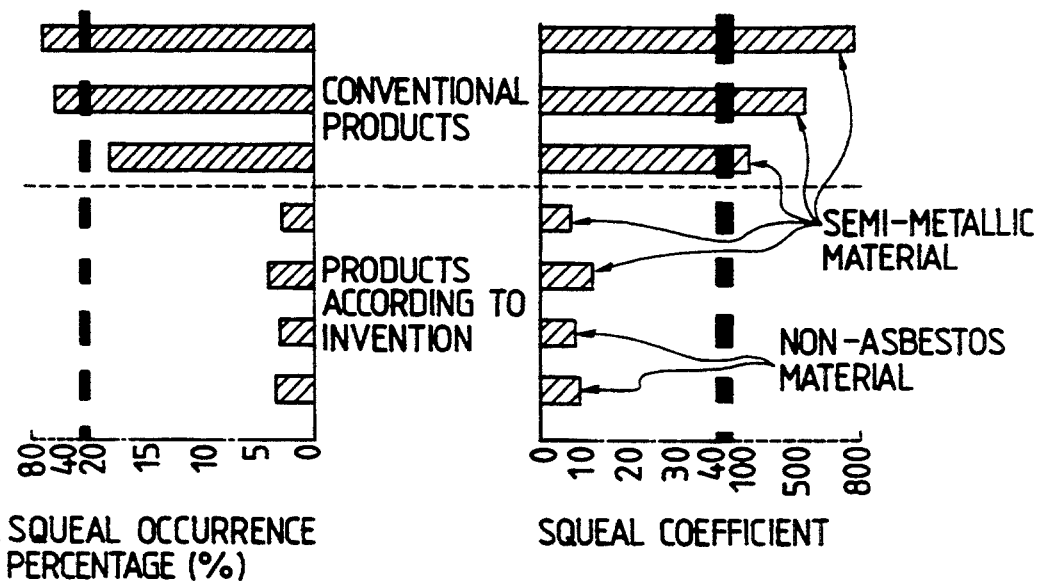
FIG. 6 is a graph for comparing the differences in squeal between the product according to the present invention and the conventional one.
Figure 7:
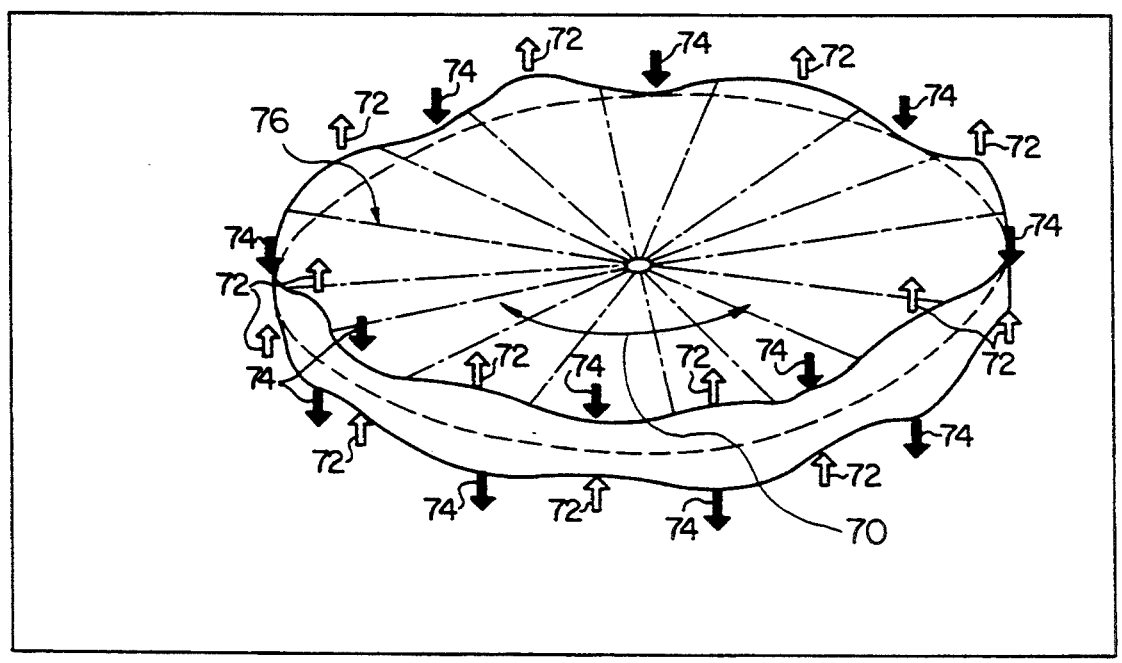
FIG. 7 is a view of analysis on vibrations of the disc rotor due to longitudinal waves.
Figure 8:
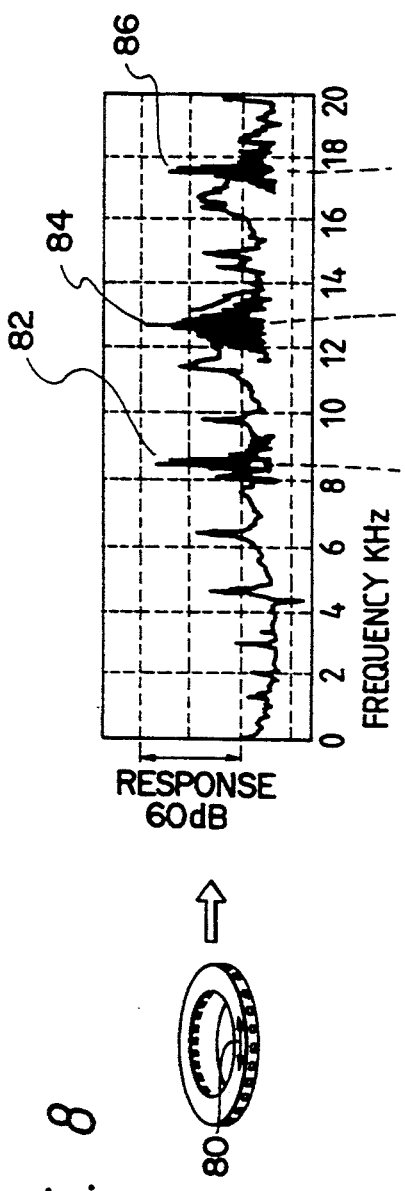
FIG. 8 is a view of analysis on vibrations onto a disc rotor by longitudinal waves.
Figure 9:
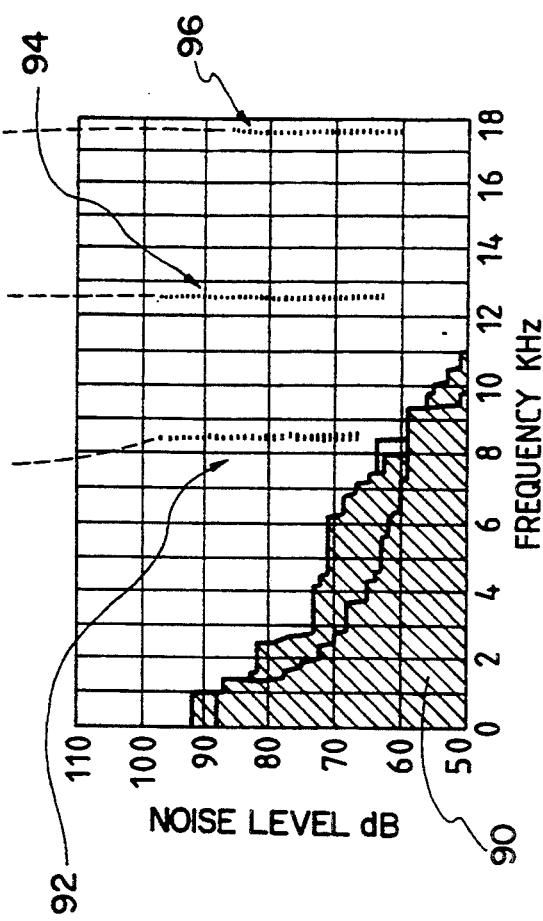
FIG. 9 shows the results of an actual car test using non-asbestos pads.
Figure 10:
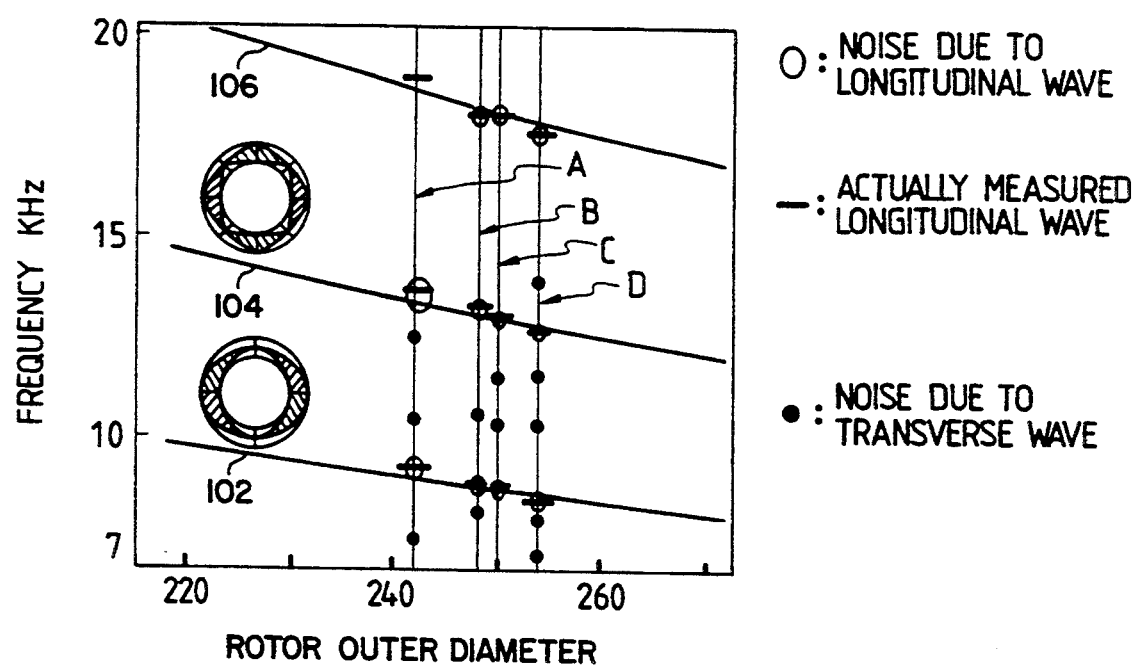
FIG. 10 is a frequency characteristic data table experimentally obtained by use of four disc rotors which were different in diameter and which were actually used on cars.

If the longitudinal wave vibration is mainly transmitted to the disc rotor, squeals due to an even number order resonance mode, that is, a resonance mode of the second, fourth, sixth order or the like, can be effectively attenuated by specially shaped hollow holes, reduced holes, or two rows of small circular holes formed in a disc rotor. Accordingly, it is possible to use various kinds of friction pads selectively. FIG. 6 is a graph comparatively showing the effects of the product according to the present invention and the conventional one. It is found that squeals can be effectively suppressed by the product according to the present invention even in the case of using friction pads made of any material of a semi-metallic group or a non-asbestos group. Further, it is possible to provide a hollow hole, a reduction hole, or two rows of small circular holes in accordance with the type of a rotor, and those holes may be merely formed in at least one portion on the circumference of the rotor. Accordingly, manufacturing time is greatly reduced.

What is claimed is:

1. A disc rotor arrangement for preventing squeal, comprising:
    a ventilated rotor element having a plurality of holes extending radially therein and being capable of passing air therethrough, said rotor having a front braking surface and a rear braking surface;
    wherein at least one of said holes is an expanded hole expanded in a direction toward said front and rear braking surfaces relative to remaining ones of said plurality of holes, said at least one hole radially passing through said rotor between said front and rear braking surfaces, said expanded hole reducing a first minimum thickness between an inner surface of said expanded hole and each of said front and rear braking surfaces in an axial direction relative to a second minimum thickness between an inner surface of said remaining ones of said plurality of holes and each of said front and rear braking surfaces in an axial direction.

2. A disc rotor arrangement for preventing squeal according to claim 1, wherein said expanded hole is curved in cross sectional area near each of said front and rear braking surfaces.

3. A disc rotor arrangement for preventing squeal according to claim 1, wherein said first minimum thickness is not larger than about 3 mm.

4. A disc rotor arrangement for preventing squeal according to claim 1, including a plurality of said expanded holes.

5. A disc rotor arrangement for preventing squeal according to claim 1, wherein said expanded hole has a cross section which provides a variable thickness in said ventilated rotor element between said expanded hole and each of said front and rear braking surfaces.

6. A disc rotor arrangement for preventing squeal, comprising:
    a ventilated rotor, said ventilated rotor having a radial outer surface and a radial inner surface, said ventilated rotor having at least one expanded hole and at least one unexpanded hole, each of said expanded and unexpanded holes capable of having air flow therethrough;
    a front braking surface on said ventilated rotor, said front braking surface having a radial width between said radial outer surface and said radial inner surface; and
    a rear breaking surface on said ventilated rotor, said rear braking surface having a radial width between said radial outer surface and said radial inner surface;
    wherein said at least one expanded hole is formed to extend radially in said ventilated rotor from said radial outer surface toward said radial inner surface, said at least one expanded hole reducing a first minimum thickness between an inner surface of said at least one expanded hole and each of said front and rear braking surfaces in an axial direction relative to a second minimum thickness between an inner surface of said unexpanded hole and each of said front and rear braking surfaces in an axial direction.

7. A disc rotor arrangement for preventing squeal according to claim 6, wherein said at least one expanded hole is curved in cross sectional area near each of said front and rear braking surfaces.

8. A disc rotor arrangement for preventing squeal according to claim 6, wherein said at least one expanded hole has a cross sectional area which provides a variable thickness in said ventilated rotor element between said inner surface of said at least one expanded hole and each of said front and rear braking surfaces.

9. A disc rotor arrangement for preventing squeal according to claim 6, wherein said first minimum thickness is not larger than about 3 mm.

10. A disc rotor arrangement for preventing squeal according to claim 6, including a plurality of said expanded holes.

11. A disc rotor arrangement for preventing squeal according to claim 6, including a plurality of said unexpanded holes.

* * * * *